(12) United States Patent
Busch-Sorensen

(10) Patent No.: US 9,509,436 B2
(45) Date of Patent: Nov. 29, 2016

(54) PROTECTION OF NEAR-FIELD COMMUNICATION EXCHANGES

(71) Applicant: Cubic Corporation, San Diego, CA (US)

(72) Inventor: Thomas Busch-Sorensen, San Diego, CA (US)

(73) Assignee: Cubic Corporation, San Diego, CA (US)

(*) Notice: Subject to any disclaimer, the term of this patent is extended or adjusted under 35 U.S.C. 154(b) by 470 days.

(21) Appl. No.: 13/735,226

(22) Filed: Jan. 7, 2013

(65) Prior Publication Data

US 2013/0130614 A1 May 23, 2013

Related U.S. Application Data

(63) Continuation-in-part of application No. 12/503,746, filed on Jul. 15, 2009, now Pat. No. 8,350,668.

(60) Provisional application No. 61/148,314, filed on Jan. 29, 2009.

(51) Int. Cl.
| | |
|---|---|
| *H04K 3/00* | (2006.01) |
| *H04B 5/00* | (2006.01) |
| *G06K 7/10* | (2006.01) |
| *G06K 19/073* | (2006.01) |
| *G06K 19/077* | (2006.01) |

(52) U.S. Cl.
CPC ............ *H04K 3/86* (2013.01); *G06K 7/10287* (2013.01); *G06K 19/07336* (2013.01); *G06K 19/07783* (2013.01); *H04B 5/005* (2013.01); *H04B 5/0081* (2013.01)

(58) Field of Classification Search
CPC ........................ H04W 4/008; H04W 56/00
See application file for complete search history.

(56) References Cited

U.S. PATENT DOCUMENTS

| | | |
|---|---|---|
| 5,613,001 A | 3/1997 | Bakhoum |
| 5,627,357 A | 5/1997 | Cheng et al. |
| 6,446,049 B1 | 9/2002 | Janning et al. |
| 7,185,806 B2 | 3/2007 | Sines |

(Continued)

FOREIGN PATENT DOCUMENTS

| | | |
|---|---|---|
| DE | 102004031092 A1 | 1/2006 |
| EP | 1918859 A1 | 5/2008 |

(Continued)

OTHER PUBLICATIONS

Bundesmant fur Sicherheit in der Informationstechnik, "Messung ger Abstrahleigenschaften von RFID-Systemen (MARS) [Possibilities for passive eavsdropping on an RFID communication]", Projektdokument 1, 2008, pp. 1-33.

(Continued)

*Primary Examiner* — Bobbak Safaipour
(74) *Attorney, Agent, or Firm* — Kilpatrick Townsend & Stockton LLP

(57) ABSTRACT

Techniques are disclosed for protecting communication of an NFC-enabled device by generating one or more blocking signals during an NFC data exchange. The blocking signal(s) can include a similar carrier frequency, modulation type, and/or modulation rate an NFC signal, thereby effectively masking the NFC signal. Furthermore, the blocking signal(s) can have a varying amplitude and/or length, which can further mask when an NFC signal is transmitted.

20 Claims, 12 Drawing Sheets

(56) References Cited

U.S. PATENT DOCUMENTS

| | | | |
|---|---|---|---|
| 7,195,173 B2 | 3/2007 | Powell et al. | |
| 7,219,837 B2 | 5/2007 | Rietveld | |
| 7,221,900 B2 | 5/2007 | Reade et al. | |
| 7,308,516 B2 | 12/2007 | Dressen et al. | |
| 7,392,943 B2 | 7/2008 | Rietveld | |
| 8,113,435 B2 | 2/2012 | Busch-Sorensen | |
| 8,240,561 B2 | 8/2012 | Busch-Sorensen | |
| 8,350,668 B2* | 1/2013 | Busch-Sorensen | G06K 19/07309 340/10.1 |
| 8,392,296 B2 | 3/2013 | Powers et al. | |
| 2002/0032657 A1 | 3/2002 | Singh | |
| 2002/0087857 A1 | 7/2002 | Tsao et al. | |
| 2004/0100359 A1 | 5/2004 | Reade et al. | |
| 2004/0223481 A1 | 11/2004 | Juels et al. | |
| 2005/0133606 A1 | 6/2005 | Brown | |
| 2005/0236491 A1 | 10/2005 | Leaming | |
| 2006/0032906 A1 | 2/2006 | Sines | |
| 2006/0056622 A1 | 3/2006 | Liardet et al. | |
| 2006/0065714 A1 | 3/2006 | Jesme | |
| 2006/0065731 A1 | 3/2006 | Powell et al. | |
| 2006/0226969 A1 | 10/2006 | Bandy | |
| 2006/0273176 A1 | 12/2006 | Audebert et al. | |
| 2006/0291657 A1 | 12/2006 | Benson et al. | |
| 2007/0026825 A1* | 2/2007 | Wilson | G06K 7/0008 455/130 |
| 2007/0034691 A1 | 2/2007 | Davis et al. | |
| 2007/0075145 A1 | 4/2007 | Arendonk | |
| 2007/0152052 A1 | 7/2007 | Sines | |
| 2007/0159400 A1 | 7/2007 | DeJean et al. | |
| 2007/0267503 A1 | 11/2007 | Dewan | |
| 2008/0000987 A1 | 1/2008 | Augustinowicz et al. | |
| 2008/0081588 A1* | 4/2008 | Rofougaran | H04B 1/109 455/272 |
| 2008/0093467 A1 | 4/2008 | Narendra et al. | |
| 2008/0233867 A1* | 9/2008 | Rofougaran | H03F 3/211 455/41.1 |
| 2010/0187308 A1 | 7/2010 | Sorensen | |
| 2010/0188195 A1 | 7/2010 | Sorensen | |
| 2011/0243120 A1* | 10/2011 | Ginsburg | G06K 7/10237 370/345 |
| 2013/0201316 A1* | 8/2013 | Binder | H04L 67/12 348/77 |

FOREIGN PATENT DOCUMENTS

| | | |
|---|---|---|
| EP | 2392078 A1 | 12/2011 |
| WO | 01/84861 A1 | 11/2001 |
| WO | 2004/001657 A1 | 12/2003 |
| WO | 2005/052846 A2 | 6/2005 |

OTHER PUBLICATIONS

De Koning Gans, Gerhard et al., "A Practical Attack of the MIFARE Classic", Institute for Computing and Information Sciences, Radboud University, Nijmegen, The Netherlands, no date, 15 pages.

Finke, Thomas et al., "Radio Frequency Identification: Abhormoglichkeiten der Kommunikation zwischen Lesegerat und Transponder am Beispiel eines ISO14443-Systems [Possible eavesdropping of the communication between reader and transponder in an ISO14443 system]", no date, pp. 1-9.

Hancke, Gerhard P., "Eavesdropping Attacks on High-Frequency RFID Tokens", Jul. 11, 2008, University of Cambridge slideshow, no date, 36 pages.

Hancke, Gerhard P., "Noisy Carrier Modulation for HF RFID", no date, 4 pages.

Hancke, Gerhard P., "Practical Attacks on Proximity Identification Systems", May 26, 2006, University of Cambridge slideshow, pp. 1-19.

Heydt-Benjamin, Thomas S. et al., "Vulnerabilities in First-Generation RFID-enabled Credit Cards", no date, 13 pages.

Jacobs, Bart et al., "Smart Cards in Public Transport: The Midfare Classic Case," dated Apr. 22, 2008, 11 pages.

Juels et al., "The Blocker Tag: Selective Blocking of RFID Tags for Consumer Privacy", Proceedings of the 10th ACM Conference on Computer and Communications Security, Washington, D.C., Oct. 27-31, 2003; vol. Conf. 10, Oct. 27, 2003, pp. 103-111.

Juels, Ari et al., "Soft Blocking: Flexible Blocker Tags on the Cheap", RSA Laboratories, Bedford, MA 01730, USA; no date, 14 pages.

Karygiannis, Tom et al., "Guidelines for Securing Radio Frequency Identification (RFID) Systems", Recommendations of the National Institute of Standards and Technology, U.S. Department of Commerce Special Publication 800-98, Apr. 2007, 154 pages.

Kirschenbaum, Ilan et al., "How to Build a Low-Cost, Extended-Range RFID Skimmer", Feb. 2, 2006, pp. 1-22.

Mirowski, Luke et al., "Deckard: A System to Detect Change of RFID Tag Ownership",International Journal of Computer Science and Network Security, Jul. 2007, 10 pages, vol. 7 No. 7, University of Tasmania, Hobart Australia.

NXP Semiconductors, Contents, pp. 1-16, NXP Confidential, Version 2.1, Jul. 23, 2008.

NXP Semiconductors, ISO/IEC 14443 Eavesdropping and Activation Distance: 13.56 MHz proximity smart cards, Application Note, Rev. 01.00-26 Sep. 2007, 25 pages.

PCT International Preliminary Report on Patentability and Written Opinion mailed on Aug. 2, 2011 for International Application No. PCT/US2010/021935, 10 pages.

PCT International Preliminary Report on Patentability and Written Opinion mailed on Aug. 2, 2011 for International Application No. PCT/US2010/021939, 6 pages.

PCT International Search Report and Written Opinion mailed May 11, 2010; International Application No. PCT/US2010/021939; 8 pages.

PCT International Search Report and Written Opinion mailed Oct. 14, 2010, International Application No. PCT/US2010/025878, 11 pages.

PCT Partial International Search Report mailed Mar. 25, 2010 for International Application No. PCT/US2010/021935; 6 pages.

Press Release, "Integrated Engineering introduces anti-eavesdropping device", Integrated Engineering Jul. 2005, 2 pages.

Siekerman, Pieter et al., "Security Evaluation of the Disposable OV-Chipkaart", V1.6, dated Jul. 26, 2007, 35 pages.

Verdult, ing R., "Proof of concept, cloning the OV-Chip Card", no date, 2 pages.

Australian Patent Examination Report No. 1 for No. 2010208474 issued Mar. 28, 2014, 5 pages.

Office Action mailed Feb. 3, 2016 for Canada Application No. 2,751,113, filed Jan. 25, 2010.

Office Action mailed Jun. 21, 2016 for European Application No. 10701438.3, filed Jan. 25, 2010.

* cited by examiner

PROTECTION OF NEAR-FIELD COMMUNICATION EXCHANGES

CROSS-REFERENCES TO RELATED APPLICATIONS

This application is a continuation-in-part of U.S. patent application Ser. No. 12/503,746, titled "Smartcard Protocol Transmitter" and filed on Jul. 15, 2009. This application claims the benefit of and is a non-provisional of U.S. provisional patent application 61/148,314, titled "Countermeasures Against Remote Eavesdropping" and filed on Jan. 29, 2009, which is assigned to the assignee hereof and incorporated herein by reference for all purposes.

BACKGROUND

The present application relates generally to communication systems and, more particularly, to communication systems in which data is exchanged between devices using near-field communication (NFC).

NFC-enabled devices, such as mobile phones, tablets, and other electronics, are increasingly becoming utilized to purchase goods and services, transfer data, and perform other functions using NFC. In many of these transactions such devices simulate wireless smart cards by utilizing a contactless smartcard protocol (CSC). For example, it is now possible to pay for gasoline, groceries, and transit fares simply by waving an NFC-enabled device in the vicinity of a card reader.

These NFC-enabled devices can engage in peer-to-peer data exchanges, as well as exchanges with active and passive NFC devices, by using electromagnetic radiation. These exchanges, however, can involve an over-the-air exchange of sensitive information such as account numbers, key values, and other identifiers. Accordingly, these exchanges are susceptible to eavesdropping which can lead to ID theft and/or other improper use.

Data encryption can help to reduce the incidence of hacking attacks. However, encryption algorithms can be cracked, may not always be available during data exchanges, and are susceptible to unforeseen weaknesses.

BRIEF SUMMARY

Techniques are disclosed for protecting communication of an NFC-enabled device by generating one or more blocking signals during an NFC data exchange. The blocking signal(s) can include a similar carrier frequency, modulation type, and/or modulation rate an NFC signal, thereby effectively masking the NFC signal. Furthermore, the blocking signal(s) can have a varying amplitude and/or length, which can further mask when an NFC signal is transmitted.

An example transmitter for protecting a first NFC signal transmitted by a mobile device, according to the disclosure, can include a transmit circuit configured to generate a first blocking signal having a carrier frequency of the first NFC signal such that the first blocking signal is transmitted while the first NFC signal is transmitted, and modulate the first blocking signal with a type of modulation of the first NFC signal. The transmitter further can include a first antenna communicatively coupled to the transmit circuit so as to radiate the first blocking signal, and configured to be coupled with the mobile device.

An example method of protecting NFC signals, according to the disclosure, can include generating a first blocking signal at a carrier frequency of a first NFC signal generated by a mobile device such that the first blocking signal has a varying amplitude, modulating the first blocking signal with a certain modulation having the same modulation type and modulation rate of the first NFC signal, and driving an antenna coupled to the mobile device with the modulated first blocking signal while the mobile device transmits the first NFC signal.

An example mobile device, according to the disclosure, can include an NFC antenna, a signal-blocking antenna, and a processing unit coupled to the NFC antenna and the signal-blocking antenna. The processing unit can be configured to perform functions including causing the NFC antenna to transmit an NFC signal having a carrier frequency, a modulation rate, and a modulation type, generating a blocking signal at the carrier frequency of the NFC signal, and modulating the blocking signal with a certain modulation having the same carrier frequency, modulation rate, and modulation type as the NFC signal. The processing unit can be configured to cause the signal-blocking antenna to transmit the modulated blocking signal while the NFC antenna is transmitting the NFC signal.

Other and further aspects of the invention will become apparent during the course of the following description and with reference to the accompanying drawings.

DETAILED DESCRIPTION OF EMBODIMENTS

The ensuing description provides preferred exemplary embodiments only, and such preferred exemplary embodiments are not intended to limit the scope or applicability of the present invention. Rather, the ensuing description will enable those who are skilled in the art to implement such preferred exemplary embodiments. Persons of skill in the art will recognize that various changes may be made in the function and arrangement of elements without departing from the spirit and scope of the invention as set forth in the appended claims.

Figure 1:
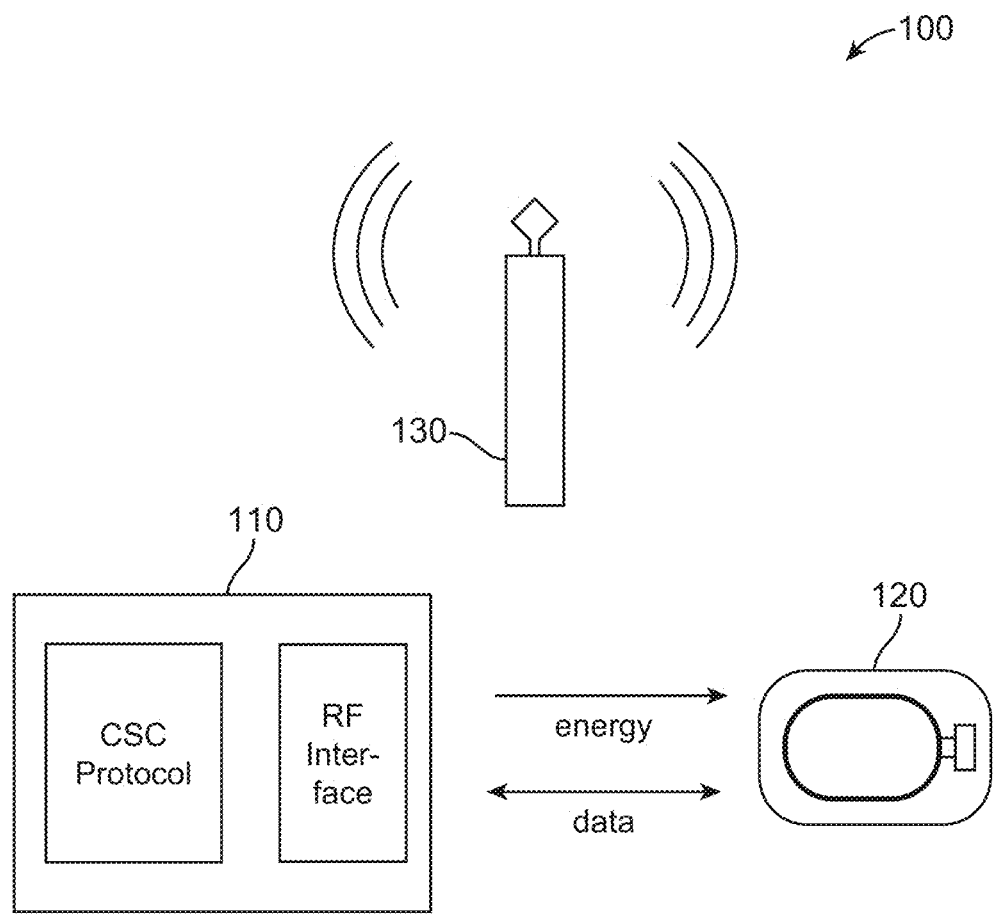
FIG. 1 is a diagram of an embodiment of a card reader system.

FIG. 1 shows a card reader system 100 according to one embodiment of the present invention. As illustrated, card reader system 100 includes a card reader 110 and a contactless smartcard 120 (also referred to as "card" or "smartcard"). Card reader system 100 can be used for ticketing or similar transactions in which a contactless smartcard is presented to a card reader to gain access to services. For example, card reader system 100 can be located at a transit station gate for admitting passengers to the transit system. Of course, card reader system 100 is not limited to a particular application but can be any system in which data is exchanged between a smartcard and a card reader. Some exemplary applications of card reader system 100 include POS terminals used with contactless credit cards, access control systems, and electronic identification systems.

Card reader 110 communicates with card 120 via an electromagnetic signal. As shown, a radio frequency interface of card reader 110 generates a carrier signal which, in turn, provides commands and data to smartcard 120. The carrier signal can also supply energy for operating smartcard 120. Smartcard 120 receives the commands and data and can modulate the carrier in order to communicate with card reader 110. In this way, bidirectional communication between the devices is possible.

Card reader 110 includes a contactless smartcard protocol (CSC) controller. The CSC controller can modulate the carrier with outbound data from card reader 110 and can demodulate inbound communications from smartcard 120. In various embodiments, card reader 110 partially or fully implements ISO 14443 standards for proximity cards. As will be recognized by persons of skill in the art, the ISO 14443 standards encompass different types of cards, each having its own variations for communicating with a card reader. For example, depending upon its application, the CSC protocol controller of card reader 110 can support communication with ISO 14443 Type A cards, Type B cards, or some other card type.

Alternatively or additionally, the CSC protocol can be as described in the EMV standard (Europay, MasterCard, and Visa), or some other commercial standard for contactless smartcard communications. In some embodiments, the CSC protocol can be proprietary and can include proprietary elements such as commands and data structures. For example, contactless smartcard 120 can be a Mifare® Ultralight or Mifare® Classic card from NXP Semiconductor. Card reader 110 can be configured to communicate using commands and data structures appropriate for one or more card types.

Card reader 110 can communicate with smartcard 120 by amplitude modulating the radio frequency carrier. With ISO 14443 cards, the RF interface can emit a 13.56 MHz carrier signal. To communicate with a Type A card, for example, the CSC protocol controller performs an on-off modulation of the carrier signal at the RF interface. The Type A card responds to the outbound communication by load modulating the carrier at specific sub-carrier frequencies (i.e., ±847 kHz). Load modulation can change the amplitude of the carrier by around 0.5% to 5.0%. Card reader 110 can detect modulation at the sub-carrier frequency and recover the inbound data.

With Type B cards, instead of a full-amplitude modulation, card reader 110 can modulate the radio frequency carrier at around 10-20% of its peak value. A Type B smartcard can respond to the outbound modulation by phase-modulating the carrier. Card reader 110 can detect phase modulation of the carrier and the CSC protocol controller can coordinate the exchanges used to carry out different types of transactions.

Because a radio frequency carrier signal is used for communication, it is possible to eavesdrop on exchanges between the card reader 110 and smartcard 120 from beyond the normal operating range of the devices. For example, with an RF probe or other remote antenna, it might be possible to detect communications between card reader 110 and smartcard 120 from a distance of approximately 0.3-5.0 meters. Absent countermeasures, a hacker or eavesdropper might be able to capture information exchanged between devices and use it for unlawful purposes.

Smartcard protocol transmitter (also "transmitter") 130 protects the carrier signal used by card reader 110 and smartcard 120. In some embodiments, transmitter 130 generates a second radio frequency carrier at the operating frequency of card reader 110 and can simulate a data exchange between a non-existent smartcard and a card reader.

In one embodiment, transmitter 130 emits a second 13.56 MHz carrier signal. Transmitter 130 can control an amplitude modulation of the second carrier to simulate outbound communications from a card reader and it can also modulate the second carrier at the appropriate sub-carrier frequencies to simulate inbound smartcard communications. For example, to mimic communication from a card reader to a Type A card, transmitter 130 can perform an on-off keying of the second carrier. It can also simulate the effect of a card's load modulation by modulating the second carrier at the appropriate sub-carrier frequencies and with the appropriate modulation characteristics.

One or more antennas can be used to radiate an electric field (E-field), a magnetic field (H-field), or a combination of the two (E+H field). In some embodiments, transmitter 130 includes a loop antenna for radiating a magnetic field that closely approximates the H-field of card reader 110. For example, the inventor of the present application has been determined that a field strength of approximately 0.5 A/m can effectively block out a card's load modulation of the card reader's carrier signal from detection outside of the card reader's normal operating range. The loop antenna can be shielded and driven as a balanced load so that, in effect, transmitter 130 appears to a hacker or eavesdropper as if it were a second card reader.

Alternatively, the antenna of transmitter 130 can be configured to radiate an electric field. The inventor of the present application has discovered that it is possible to mimic card reader operation with electric field emissions while avoiding interference with the operation of card reader systems. For example, even when electric field strength approaches maximum permissible levels, it has been discovered that a typical smartcard has only limited sensitivity to such emissions.

In some embodiments, transmitter 130 includes a monopole or dipole antenna. The antenna can be unbalanced and designed to present a high impedance so that it conducts a relatively high voltage. For example, based on the antenna size and carrier wavelength, an E-field antenna can be driven at approximately 50V peak-to-peak. In a related embodiment, transmitter 130 varies the polarization of the electric field so as to approximate a stray electric field from card reader 110. For this purpose, a second E-field antenna can be situated at around ninety degrees in relation to the first antenna and transmitter 130 can drive the two antennas in an alternating fashion.

A modified loop antenna that radiates strongly both the magnetic and electric fields can also be used with transmitter 130. The modified loop antenna can be similar to the antenna of a contactless smartcard 120. For example, it can be unshielded and unbalanced coil that has about 1-4 turns. Preferably, the modified loop antenna of transmitter 130 is oriented in the same fashion as the antenna of card reader 110 for matching polarization.

Transmitter 130 does not affect the ability of card reader 110 to communicate with smartcard 120. As previously noted, it has been discovered that contactless smartcards are not particularly sensitive to electric fields and thus are not likely to be disturbed by E-field emissions from transmitter 130. Magnetic field strength, on the other hand, falls off rapidly with distance. By positioning transmitter 130 at least a predetermined distance from card reader 110, the likelihood of magnetic field interference is minimized. For example, in some embodiments, transmitter 130 is placed at a predetermined minimum distance of about 0.25 meters from card reader 110. Persons of skill in the art will recognize that the separation distance can vary based on factors such as field strength, antenna orientation, etc.

When in operation, it may be difficult for an eavesdropper to discriminate between the signals from transmitter 130 and the signals from card reader 110 with a remote antenna. For example, even if a relatively sophisticated magnetic field probe is utilized to eavesdrop on card transactions, it is likely to pick up electric field emissions as well as the magnetic field due to limited directivity. Although magnetic field probes can be shielded, shielding adds stray capacitance to the magnetic loop. Stray capacitance, in turn, can cause the probe to operate above its resonant frequency, limiting the size that can be used without attenuation. Practically speaking, a magnetic field probe used well outside of the card reader's normal operating range would need to be on the order of 0.5 meters in diameter, making it difficult to conceal.

As a further protection, transmitter 130 can also vary the amplitude of the second carrier signal from time to time to increase the difficulty of eavesdropping on card transactions. For example, by randomly varying the amplitude of the second carrier, an eavesdropper may be unable to maintain a fixed trigger level. Thus, emissions from transmitter 130 increase both the practical and technical difficulties of remote eavesdropping.

Figure 2:
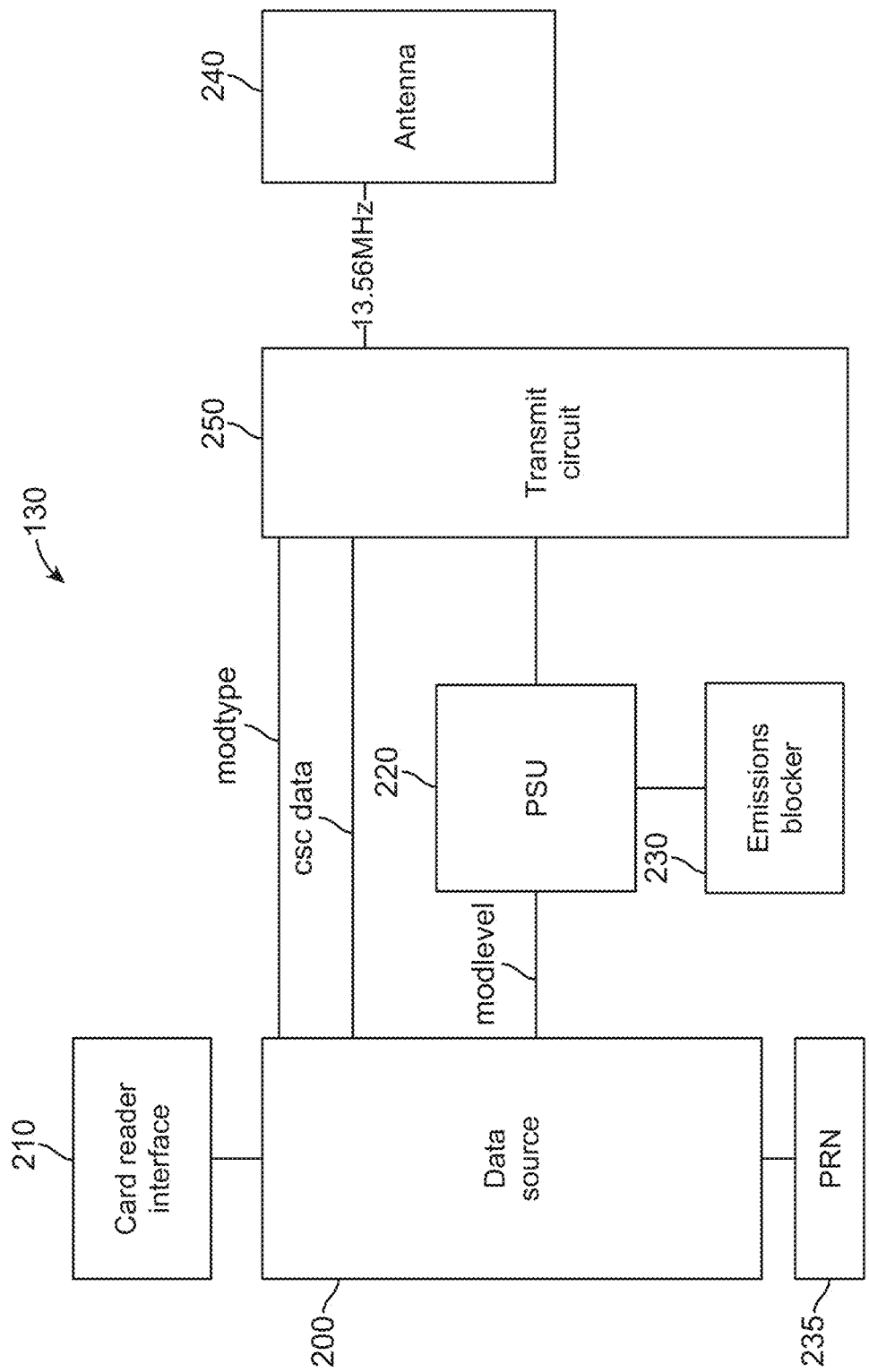
FIG. 2 is a diagram of an embodiment of a smartcard protocol transmitter.

FIG. 2 is a block diagram of a smartcard protocol transmitter 130 according to one embodiment of the present invention. Transmitter 130 is shown as having a data source 200, a programmable power supply (PSU) 220, a transmit circuit 250, and an antenna 240. Data source 200 can include one or more logic elements such as a complex programmable logic devices (CPLD), field-programmable gate arrays (FPGA), microcontrollers, microprocessors, and the like. As illustrated, data source 200 outputs a CSC data signal and various modulation signals. With these outputs, data source 200 can control the operation of transmitter 130 and can simulate outbound communications from a card reader as well as inbound communications from a smartcard.

Transmit circuit 250 can generate a radio frequency signal ("the second carrier") at a level that is determined by PSU 220. In some embodiments, transmit circuit 250 comprises an RF power amplifier and a crystal oscillator. The crystal oscillator can be configured to generate a signal with approximately the same frequency as the radio frequency carrier of card reader 110. For example, with ISO 14443 cards, the crystal oscillator can operate at approximately 13.56 MHz. The output of the crystal oscillator can be amplified by the RF power amplifier at a level that is determined by programmable power supply 220 and used to drive antenna 240.

To simulate outbound data from a card reader, data source 200 can generate CSC data that conforms with the protocol of smartcard 120. For example, to simulate communication with a MiFare® Ultralight card, data source 200 can generate one or more 7-bit command sequences at a data rate of approximately 106 kbps. The command sequences can be actual MiFare® commands, or irrelevant data such as pseudo-random bits. Depending upon the system to be protected, different data rates and command sequences can be used to simulate communication involving different cards and card protocols.

In the presently described embodiment, data source 200 controls modulation of the second carrier using a combination of the modtype and modlevel signals. The modtype signal can specify the type of modulation as, for example, a simulated inbound or a simulated outbound communication when viewed from the perspective of a card reader. The modlevel signal can specify characteristics of the simulated communication such as the amount of amplitude modulation. For example, when simulating outbound data for a Type A card, the modlevel can specify full-amplitude (100%) swing by on/off modulating the carrier. Alternatively, when simulating outbound communication for a Type B card, the output of PSU 220 can be varied to achieve a 10-20% modulation level appropriate for such cards.

Transmit circuit 250 modulates the second carrier with the CSC data based on the signals from data source 200. Continuing with the case of simulated outbound communications for a Type A card, transmit circuit 250 can on-off modulate the 13.56 MHz second carrier with the CSC data at a rate of approximately 106 kbps. The modulated output from transmit circuit 250 is used to excite antenna 240. Antenna 240, in turn, can be configured to radiate an E-field, H-Field, or combined E+H field. In some embodiments, antenna 240 is oriented in relation to transmitter 130 so as to match the orientation of the card reader's a transmit antenna.

Data from a smartcard (inbound data) can be simulated in a similar fashion. Data source 200 can set the modtype and modlevel signals so as to mimic the modulation characteristics of smartcard 120. With Type A cards, for example, the modulation level can be set at PSU 220 to approximately 0.5%-5.0% of the carrier amplitude to simulate card modulation capabilities. The CSC data can also be made to mimic characteristics of card data such as Manchester coding, data rate, response length, etc. Thus, for example, data source 200 can simulate inbound data from a Type A smartcard by directing transmit circuit 250 to modulate the second carrier with the Manchester coded CSC data signal at 847 kHz sub-carrier frequencies and with an amplitude variation of approximately 0.5-5.0%.

Transmitter 130 can also include a card reader interface 210. Card reader interface can be coupled to data source 200 and can carry status and control messages between devices. In one embodiment, data source 200 detects the state of card reader 110 and activates or deactivates transmitter 130. For example, data source 200 can be configured to activate transmitter 130 whenever card reader 110 is detected as being operational. Data source 200 can also be configured to control operation of card reader 110. In some embodiments, data source 200 enables operation of card reader 110 by generating an authorization signal at card reader interface 210. In this way, operation of card reader 110 can be prevented unless transmitter 130 is also functioning.

An emissions blocker 230 can also be included with transmitter 130. In some embodiments, emissions blocker 230 includes a capacitive or magnetic clamping circuit. The clamping circuit can be configured to block conductive emissions from transmitter 130 to the electrical power system. For example, it might be possible to obtain information about the operation of transmitter 130 by monitoring emissions on the mains line. This information could be used to facilitate hacking of card reader system 100. Emissions blocker 230 filters or otherwise blocks such conductive emissions.

Figure 3A:
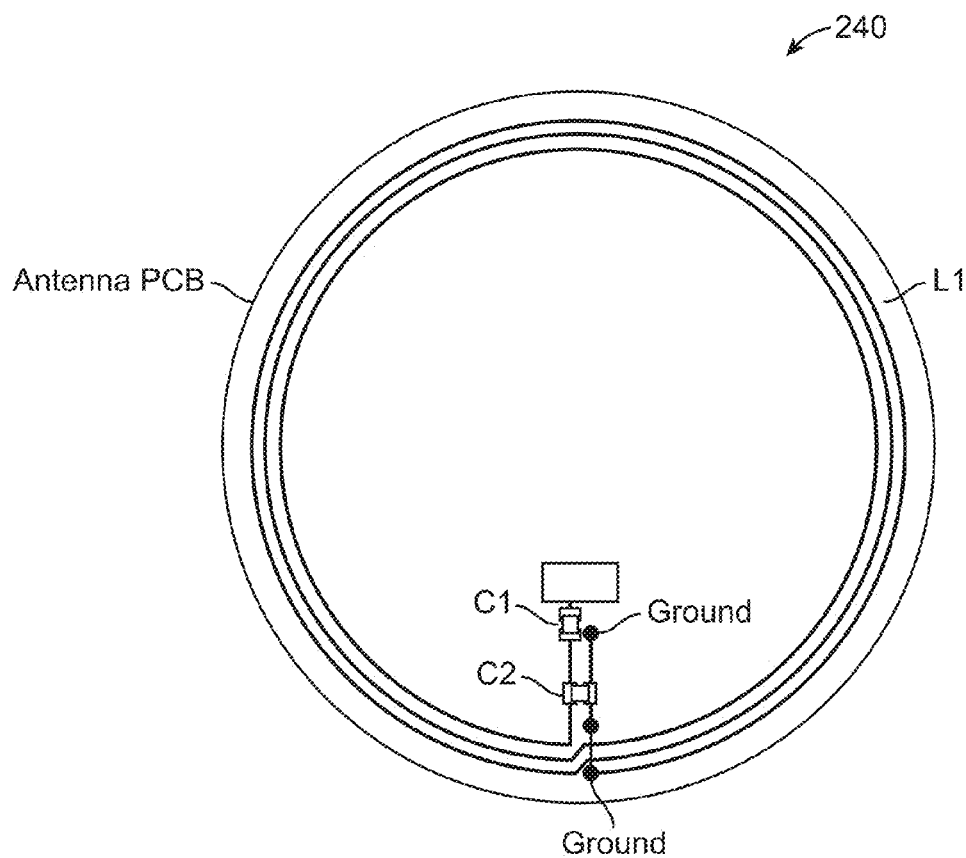
FIG. 3A shows an embodiment of a modified loop antenna.

FIG. 3A is a simplified schematic diagram of a modified loop antenna 240 such as can be used with transmitter 130. Although a modified loop antenna is discussed, it will be understood that antenna 240 can also include a monopole, dipole, magnetic loop, or combination of antennas within the scope of the present disclosure.

As shown in FIG. 3A, modified loop antenna 240 includes a coil with three turns. The coil can be superimposed on a printed circuit board which, in turn, can be detachable from transmitter 130. For example, in some embodiments, antenna 240 is detachably engaged with transmitter 130 and can be removed for regulatory compliance testing, maintenance operations, and the like. To maximize emission of the electric field, the antenna PCB is not shielded and is not balanced by a transformer as would be typical of a card reader antenna. In one embodiment, the diameter of the antenna PCB is approximately 4". However, as will be understood by those of skill in the art, modified loop antenna 240 can have more or fewer than three turns and can be sized differently for use in its particular operating environment.

Figure 3B:
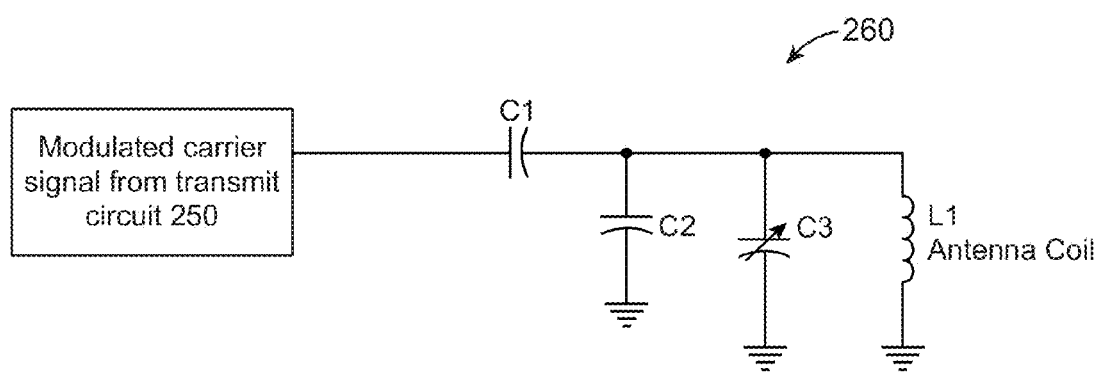
FIG. 3B illustrates an exemplary tuning circuit for use with the modified loop antenna.

FIG. 3B is an electrical model showing an exemplary tuning circuit 260 which can be used with the modified loop antenna of FIG. 3A. As illustrated, capacitors C1, C2, and C3 are coupled to inductance L1 which represents the antenna coil. Capacitance C3 is adjustable for tuning the resonant frequency of the antenna circuit. In some embodiments, circuit 260 is tuned to approximately 13.56 MHz for use with ISO 14443 cards. C1, C2, C3, and L1 can also be selected to present a relatively high impendence to transmit circuit 250 so as to maximize the coil voltage. Depending upon its configuration, tuning circuit 260 can provide a voltage gain on the order of one magnitude or more.

Figure 4:
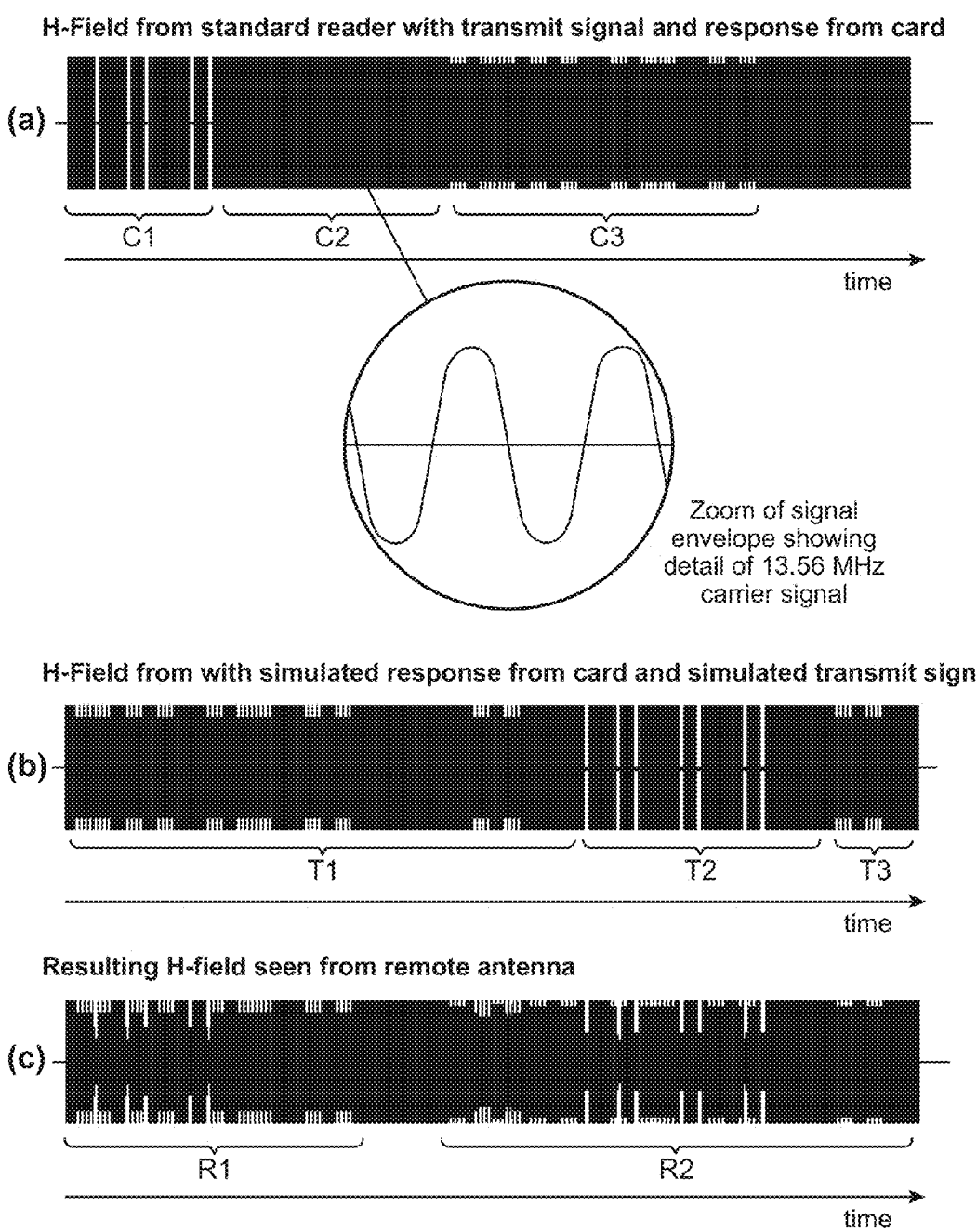
FIG. 4 shows exemplary signaling in accordance with one embodiment of a smartcard protocol transmitter.

FIG. 4 is a diagram showing an exemplary operation of transmitter 130 as part of card reader system 100. For purposes of discussion, exemplary signaling such as might be used to protect communication with a Type A card is shown and a discussion of the H-field effect is provided. In this signaling arrangement, transmitter 130 is preferably located at a distance of approximately 0.25 meters from card reader 110. Of course, transmitter 130 can be used with other card types and communication protocols and can vary the characteristics of its signaling accordingly. The following discussion is therefore illustrative only and not intended to limit the scope of the present invention.

Item (a) represents the magnetic field from card reader 110. During interval C1, card reader 110 performs an on-off keying of the radio frequency carrier signal. This modulation can represent outbound data sent by card reader 110 to smartcard 120. Following interval C1, card reader 110 pauses to wait for a response from smartcard 120. If present, smartcard 120 responds during interval C3 by load modulating the RF carrier. The effect of the load-modulation is shown by small changes (−0.5%-5.0%) in the carrier amplitude. Note that, depending upon its polarization, the load modulation can increase or reduce the carrier amplitude.

Item (b) shows an exemplary H-field such as can be emitted by transmitter 130 to protect the card transaction. As previously discussed, data source 200 causes transmit circuit 250 to modulate the second radio frequency carrier so as to simulate data from a card reader, a smartcard, or a combination of both devices. In the example shown, transmitter 130 modulates the second carrier with simulated inbound data during the interval T1 which coincides in time with intervals C1, C2, and part of interval C3.

During interval T1, transmitter 130 simulates load modulation of the second carrier by a non-existent smartcard. For example, to simulate inbound data from a Type A card, transmitter 130 modulates the 13.56 MHz second carrier at 847 kHz sub-carrier frequencies and does so at a level that mimics the capabilities of a typical smartcard. As with all simulated data, the simulated inbound data can include structured data or pseudo-random values. In one embodiment, data source 200 is configured to output bogus keying material. The bogus keying material, for example, can be "hot-listed" in card system 100 so that it is immediately recognized as invalid.

Following the interval T1, transmitter 130 switches to simulating outbound data from a card reader. This can involve changing the modtype and modlevel signals. For example, during interval T2, transmitter 130 can perform an on-off keying of the second carrier such as used with Type A cards. Outbound signals for Type B cards can be generated by limiting the amplitude modulation to approximately 10-20% of the second carrier amplitude, or other simulated signals can be used as appropriate for the card transaction to be protected.

Lastly, during interval T3, transmitter 130 switches back to modulating the second carrier with simulated card data. Of course, transmitter 130 can utilize any combination of simulated outbound and inbound signaling and can vary the duration of the simulation intervals in any manner desired. In one embodiment, the type and duration of the simulated signals is changed at an interval which approximates the length of a card transaction. For example, if a card transaction is completed in 100 ms, then transmitter 130 can vary the timing and duration of the simulated signaling at each such interval.

Item (c) illustrates the combined effect of item (a) and item (b) on the H-field such as might be seen at a distance from card reader 110. Interval R1, for example, includes the effects of outbound signaling from card reader 110 as well as the effect of the simulated inbound data from transmitter 130. Interval R2, on the other hand, includes effects of the load modulation from smartcard 120, simulated inbound data from transmitter 130, and simulated outbound data from transmitter 130.

Since transmitter 130 can vary the type of simulated signaling and the duration of the simulation as determined by data source 200, the difficulty of eavesdropping on the card transaction is significantly increased. For example, based only on the information contained in item (c), an eavesdropper would not necessarily know whether the signals produced in interval C1 or interval T2 correspond to the outbound communications from card reader 110. Similarly, with only information from item (c), an eavesdropper may not be able to distinguish the simulated inbound data in interval T1 from the actual load-modulation of smartcard 120 in interval C3.

As an added protection, transmitter 130 can vary the amplitude of the simulated signaling with time, further disrupting the ability to distinguish actual from simulated signaling. In one embodiment, data source 200 changes the modlevel signal over time based on the output of a pseudo-random number (PRN) generator 235. PRN generator 235 can be an external circuit coupled to data source 200. Alternatively, it can be included with the programmable logic of data source 200. Responsive to changes in the modlevel signal, PSU 220 varies the modulation level of the second carrier. The time-varying amplitude modulation further obscures the information in item (c) while also increasing the difficulty of signal capture. For example, varying the amplitude modulation over time can complicate attempts to trigger a signal capture on a fixed signal level.

Persons of skill in the art will also recognize that the signals from item (a) and item (b) can coincide in time producing a collision. The collision can be destructive in the sense that it may not be possible to recover the original data simply by observing the effect of the collision. As discussed in connection with FIG. 7, some embodiments of the smartcard protocol transmitter time-align transmissions with expected card responses to create the appearance of two smartcard devices responding to signals from card reader 110. In such embodiments, destructive collisions can further hinder remote eavesdropping. Note that while transmitter 130 disrupts remote eavesdropping, as discussed herein, it does not interfere with signaling between card reader 110 and smartcard 120 in the normal operating range of these devices.

Figure 5:
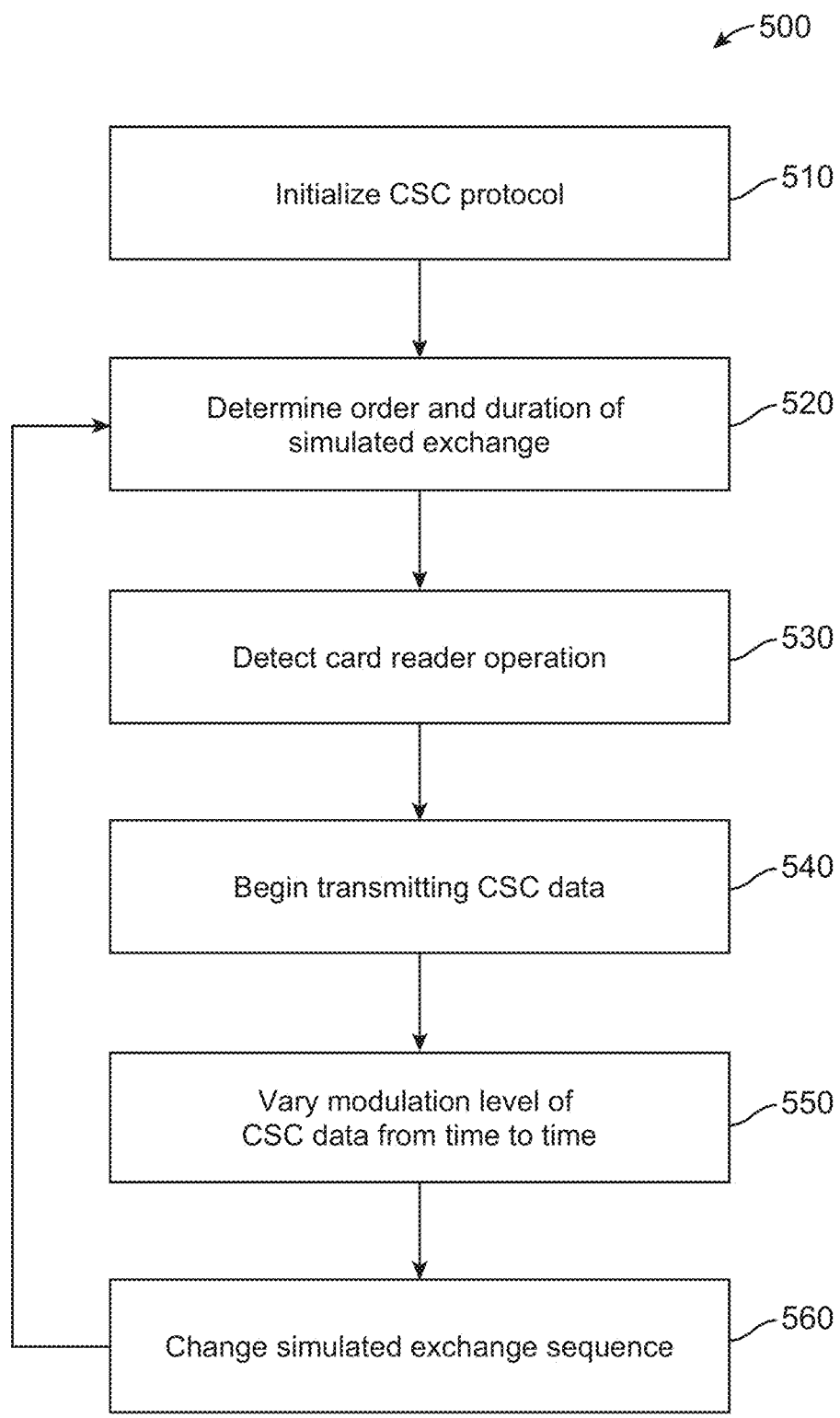
FIG. 5 illustrates exemplary processing operations such as can be performed by the smartcard protocol transmitters of FIG. 2.

FIG. 5 illustrates exemplary processing operations such as can be performed by smartcard protocol transmitter 130. When activated, at block 510, transmitter 130 determines the parameters of a simulated data exchange. This can include, for example, loading information about the requirements of a particular smartcard protocol used to protect card transactions. In one embodiment, data source 200 reads its configuration data to determine a card type and protocol. Thereafter, data source 200 loads program instructions and data corresponding to the specified protocol. The program instructions and data can be stored in one or more random-access memory (RAM) elements, read-only memory (ROM) elements, or other computer-readable storage media.

After protocol initialization, transmitter 130 determines an order and duration of the initial simulated data exchange. This can include deciding upon the particular sequence of inbound and outbound simulation intervals and the duration of each. For example, it may be desirable to have at least one interval of simulated inbound data and one interval of simulated outbound data in each time period corresponding to the average length of a card transaction. Alternatively, it may be desirable to simulate only inbound data or only outbound data for a time. Or, in some cases, transmitter 130 can choose the type of simulation and its duration on a random basis.

At block 530, an attempt can be made to detect card reader operation. For example, data source 200 can send a status inquiry to card reader 110 via interface 210. If it is determined that card reader 110 is operational, transmitter 130 can begin the simulated data exchange. On the other hand, if the card reader is not detected, the process may wait for a predetermined time and try again or it may signal an error condition and proceed with the simulated data exchange.

In a next operation, the transmitter can generate a data stream for the simulated data exchange. The data stream conforms to requirements of the CSC protocol of the protected card transactions and is used to modulate the second carrier. The data stream can include meaningless pseudo-random values or actual commands and response sequences. For example, one part of the data stream can include a well-known response sequence and another part can include false keying material. As previously noted, hot-listed data can be inserted into the data stream to facilitate the detection of hackers. The CSC data is transmitted, block 540, on the second carrier signal.

At block 550, the modulation level of the CSC data signal is varied. In some embodiments, the modulation level is varied over a predetermined range specific to the type of card to be protected. For example, the inventor of the present application has determined that Type A cards can tolerate amplitude variations on the order of 20% of the base modulation level. Accordingly, the modulation level for Type A cards can be varied over this range in one or more steps. When the simulated exchange is complete, block 560, the process can be repeated by determining the particulars of another exchange.

Figure 6:
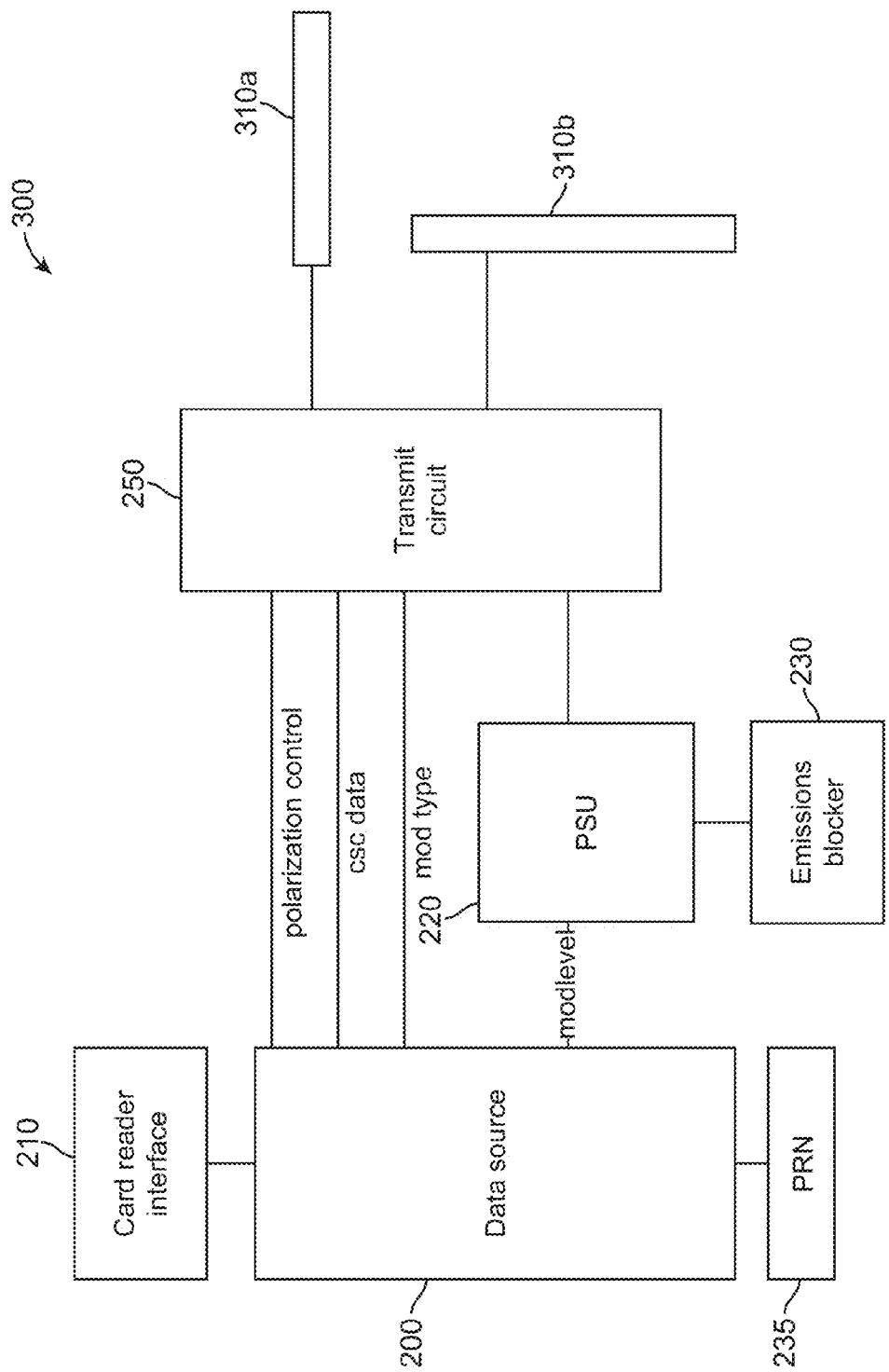
FIG. 6 is a diagram of another embodiment of a smartcard protocol transmitter.

FIG. 6 is a block diagram of a transmitter 300 according to a further embodiment of the present invention. Transmitter 300 is similar to transmitter 130 but with added features relating to antenna arrangement and polarization control. For clarity, the differences between transmitter 300 and transmitter 130 will be discussed without repeating functionality that is common to both embodiments.

As shown, antennas 310 replace antenna 240 in the construction of transmitter 300. Antennas 310a, 310b can be monopole or dipole antennas configured to radiate strongly an electric field when excited by transmit circuit 250. The antennas 310a, 310b can be paired with circuit elements that are tuned to operate at the carrier frequency of card reader 110 and which present a high impedance to transmit circuit 250. As with the modified loop antenna 240, antennas 310 can be disposed on detachable printed circuit boards to facilitate their positioning and removal for maintenance or regulatory compliance testing.

In this embodiment, data source 200 outputs a polarization control signal to transmit circuit 250. Based on the polarization control signal, transmit circuit 250 drives a selected one of antennas 310 with the modulated carrier signal. The polarization control signal can specify an E-field pattern that mimics signaling characteristics of card reader 110. In one embodiment, antennas 310 are disposed at 90 degree angles and the transmit circuit 250 drives each antenna in an alternating fashion. Of course, transmitter 300 can include more than two antennas 310 which can be disposed differently in relation to one another.

Figure 7:
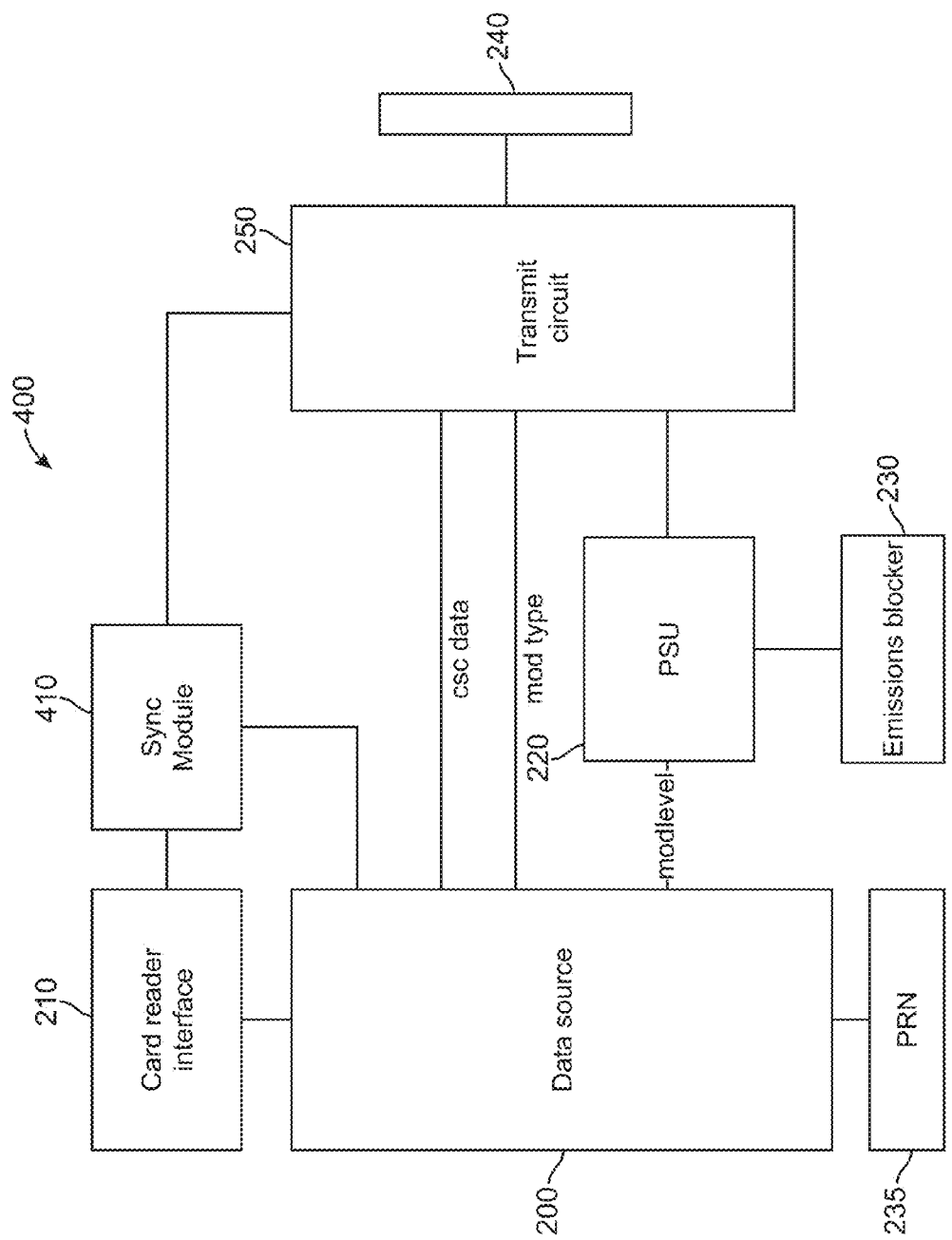
FIG. 7 is a diagram of a further embodiment of a smartcard protocol transmitter.

FIG. 7 is a block diagram of a protocol transmitter 400 according to another embodiment of the present invention. Transmitter 400 is similar to transmitter 130 but with added features relating to the detection of signaling and synchronization with card reader 110. For clarity, the differences between transmitter 400 and transmitter 130 will be discussed without repeating functionality that is common to both.

As shown, transmitter 400 includes a synchronization module 410. Synchronization module 410 is coupled to card reader interface 210, data source 200, and optionally to transmit circuit 250. In this embodiment, synchronization module 410 is configured to detect the timing and/or content of communications from card reader 110 based on signals received at card reader interface 210. For example, synchronization module 410 can detect modulation of the RF carrier and can output a timing reference for generating a simulated response to the card reader's commands. Synchronization module 410 can also provide a clock signal or other reference to transmit circuit 250 to which the second carrier can be synchronized.

When card reader 110 is operating, data source 200 can be configured to synchronize output of the CSC data signal with the timing reference from synchronization module 410. With some CSC protocols, card reader 110 and smartcard 120 communicate using a series of precisely timed exchanges. For example, card reader 110 may initiate a transaction with a Mifare® card by amplitude modulating the carrier signal with a wake-up (WUPA) or similar command. As specified by the CSC protocol, the Mifare® card can respond approximately 80 µs after the wake-up command is received. Thereafter, exchanges between card reader 110 and card 120 proceed in a well-defined fashion. As a result, an expected timing of the card's response to a particular command can be determined with knowledge of the CSC protocol. This process can be generalized to other types of cards and their corresponding protocols.

Data source 200 can determine the timing of an expected response from smartcard 120 based on information from synchronization module 410. Continuing with the example, data source 200 may determine that, if present, smartcard 120 will respond approximately 80 µs after a wake-up command from card reader 110 is detected. Data source 200 can output CSC data to transmit circuit 250 to simulate a card response at approximately the expected timing of an actual response. For example, with a Type A card, the 13.56 MHz second carrier from transmitter 400 can be modulated at the 847 kHz sub-carrier frequencies so as to coincide in time with the expected response from smartcard 120.

In effect, transmitter 400 behaves as a fictitious smartcard responding to card reader 110 commands and time-aligns its transmissions with an expected timing of actual communications from smartcard 120. The second carrier signal can be turned off when the simulated response is complete, or it can continue to transmit for a predetermined time. In some embodiments, the second carrier signal is modulated exclusively with simulated card data. However, transmitter 400 can also simulate both sides of a card transaction in a time-aligned fashion with an actual card transaction.

Figure 8:
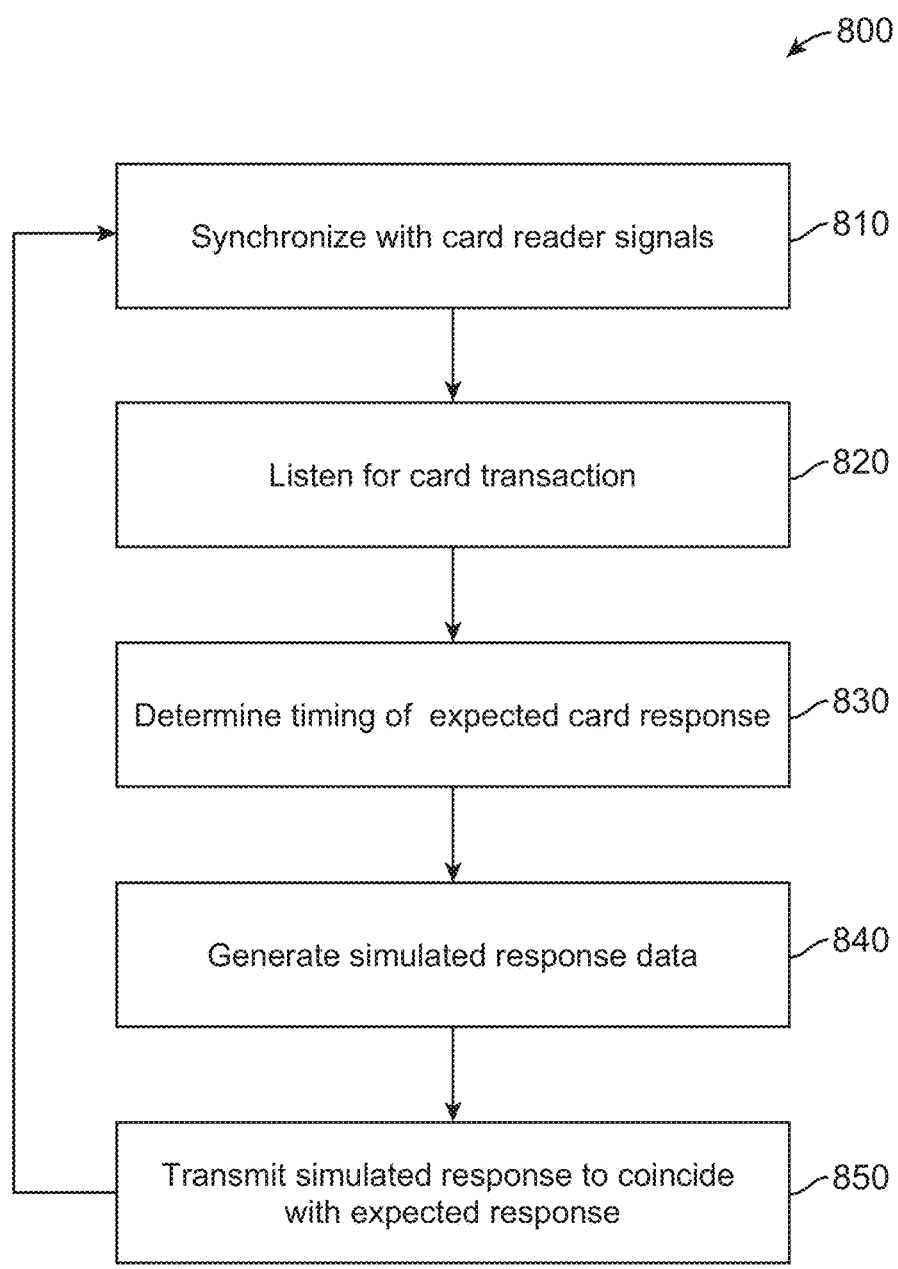
FIG. 8 illustrates exemplary processing operations such as can be performed by the smartcard protocol transmitter of FIG. 7.

FIG. 8 illustrates exemplary processing operations 800 such as can be performed by smartcard protocol transmitter 400. At block 810, the transmitter synchronizes its operation with card reader 110. In some embodiments, the transmitter includes phase-locked loop or delay-locked loop circuitry for synchronizing the second carrier to the RF carrier of card reader 110 that is received at its antenna. Alternatively or additionally, the transmitter can receive a clock signal or other timing reference at its card reader interface as part of the status and control information.

At block 820, the transmitter listens for activity indicative of a card transaction. For example, card reader 110 may continuously poll for smartcards within its operating range. If present, smartcard 120 can respond to the polling signals by sending a card identifier or other response message. The transmitter can detect the point at which a communication begins. Alternatively, by monitoring the activity of card reader 110, the transmitter can detect predetermined parts of a card transaction such as when keying material or unique identifiers are exchanged.

When a card transaction is detected, block 830, the transmitter can determine the timing of an expected response from smartcard 120. Response timing can be defined by the CSC protocol. With MiFare cards, for example, an authentication may be required before specified areas of the card's memory can be accessed. Card reader 110 may initiate the authentication by sending one or more commands to the MiFare card and then waiting a predetermined time to receive the card's response. The transmitter can detect the authentication commands and determine the timing of the expected response based on the CSC (MiFare) protocol. For example, a data source of the transmitter can load a protocol-specific module upon initialization and can use information about the CSC protocol to detect important command sequences and to determine response timing.

At block 840, the transmitter generates simulated response data. The simulated response data can mimic actual card data or it can include a series of pseudo-random values. For example, the simulated response data can include data for a card that has been deactivated or otherwise invalidated in the card reader system. In some embodiments, simulated response data is downloaded from card reader 110 when the transmitter is activated via the status interface. As a deterrent to hacking, the simulated response data can be fashioned to trigger an alarm if detected within the card reader system.

At block 850, the transmitter begins transmitting the simulated response to coincide with the expected timing of the response from smartcard 120. By time-aligning the responses, it is possible to obscure some or all of the information provided by smartcard 120. For example, the signals from the card and the transmitter can interfere destructively making it difficult to recover the transmitted data as was discussed in connection with FIG. 4. In addition, the transmitter can vary the amplitude of the simulated response transmission and drown out the relatively small signal from smartcard 120. In both cases, some or all of the card transaction can be protected from remote eavesdropping.

Figure 9A:
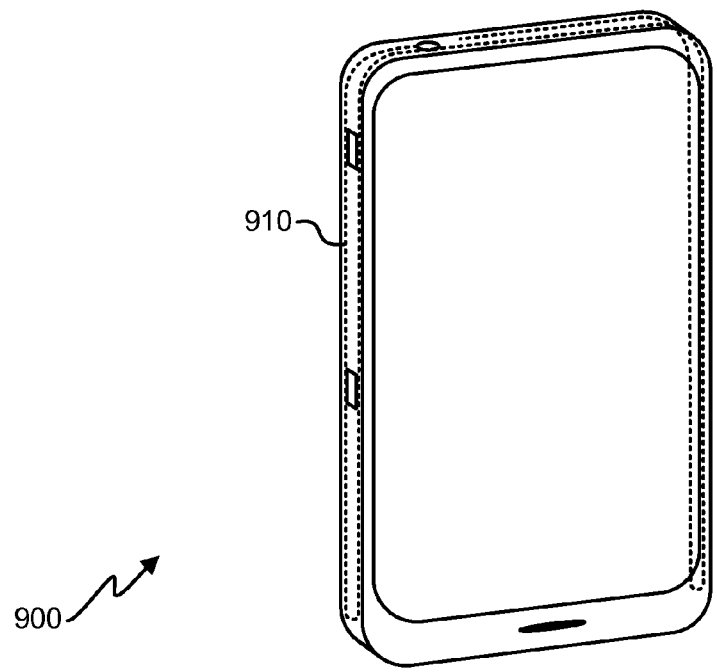
FIGS. 9A-9B illustrates an NFC-enabled device capable of performing the techniques disclosed herein.
Figure 9B:
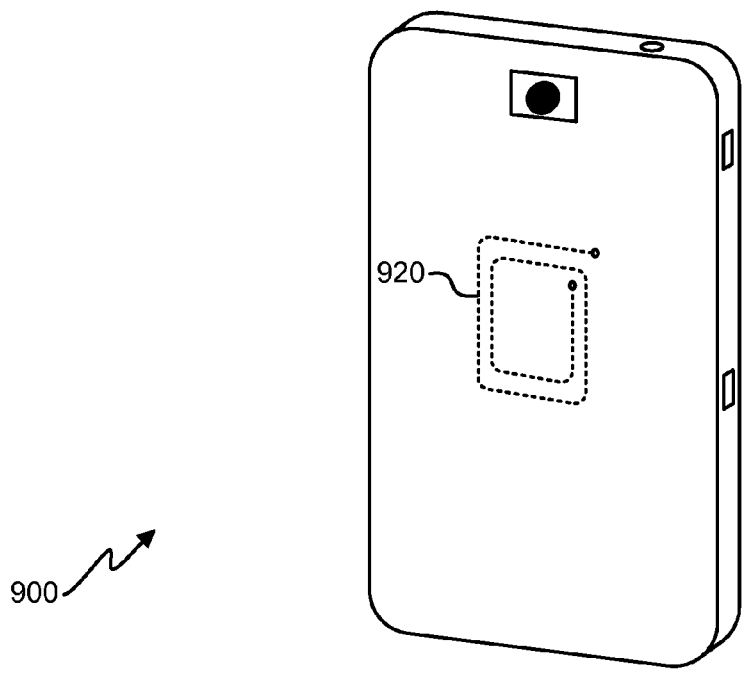

Principles described above can additionally be applied to NFC-enabled devices, such as mobile phones, tablets, and other electronics, which can communicate with smart cards, card readers, and/or each other using CSC and/or similar protocols. FIGS. 9A and 9B illustrate respective front and rear views of a mobile device 900 capable of generating a blocking signal as described above.

In this embodiment, an NFC antenna 920 is provided toward the center of the mobile device 900, and a folded dipole antenna 910 is located near the periphery of the mobile device. The NFC antenna 920 can communicate by modulating a magnetic field, as described above. The folded dipole antenna 910 can be configured to emit a blocking signal in a direction to block stray field signals from the NFC antenna 920. Although the antennas 910, 920 of the mobile device 900 include a modified loop antenna and a dipole antenna situated in particular locations in relation to each other, embodiments are not so limited. Other embodiments can include other antenna types that may be situated in other locations in relation to a mobile device. In these embodiments, if the NFC antenna has a large stray field in a particular direction, the folded dipole or other electric-field antenna could be configured such that the blocking signal is also transmitted in that particular direction. Put differently, if there is any directionality to the blocking (electric-field) antenna, it can be configured to overlap with the stray field of the NFC antenna. Moreover, one or more electric-field antennas can be configured such that the blocking signal does not have a polarity that allows the blocking signal to be avoided by simply rotating an eavesdropping antenna.

Although some embodiments include the antennas 910, 920 as integrated components of the mobile device 900, other embodiments may include one or both of the antennas 910, 920 (optionally including driving circuitry, a power supply, etc.) may be added on as an accessory to a mobile device. For example, a slip cover having an embedded electric-field antenna can be attached to a mobile device having native NFC capabilities to provide signal-blocking functionality. The embedded electric-field antenna (and/or driving circuitry) may be in electrical communication with the mobile device via, for example, a communication interface (e.g., Universal Serial Bus (USB), etc.). In such a case, the mobile device could communicate with the embedded electric-field antenna to help ensure the blocking signals are synchronized with the communication signals sent via an NFC antenna, in a manner similar to that described above in regard to a synchronization module 410 of FIG. 7. Alternatively, the embedded electric-field antenna could be configured to sense communication signals sent via an NFC antenna and transmit blocking signals in a manner similar to that described in relation to FIG. 8.

Additionally or alternatively, embodiments may allow a user to act as an electric-field antenna when holding the mobile device 900. This can be useful when a larger antenna is desired (e.g., communication utilizes relatively low carrier frequencies). Such embodiments could include an antenna at or near a surface of the mobile device such that a blocking signal couples into the body of the user. Additionally or alternatively, the mobile device could include metal contacts that directly couple the signal into the user's body when in contact with the user's skin.

Figure 10:
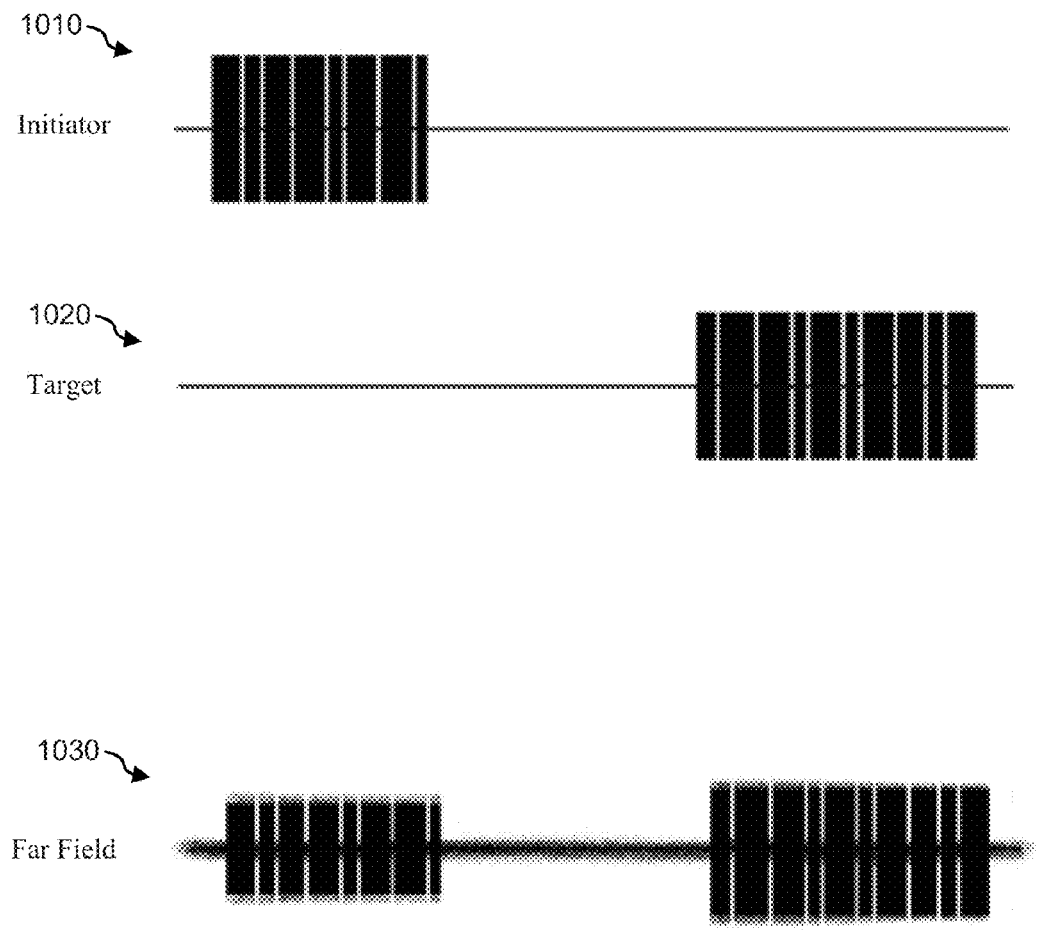
FIG. 10 illustrates example signaling during the data exchange between NFC-enabled devices.

FIG. 10 illustrates example NFC signaling during the data exchange between NFC-enabled devices, when a blocking signal is not used. Signals shown can represent, for example, a data exchange at 106 kbps, although higher baud rates can be used (utilizing type-B or Felica modulation). The NFC-enabled devices can implement an exchange following the CSC protocol (e.g., partially or fully implementing ISO 14443 standards) in a manner similar to that described above in regards to a smartcard 120 and card reader 110 of FIG. 1, although other protocols can be used.

An initiator signal 1010 represents a magnetic field modulated over time by an device initiating the data exchange. A target signal 1020 represents a response signal sent by a target device in response to the initiator signal 1010. In some embodiments, both NFC devices are active devices in which NFC antennas are driven by circuitry powered by a battery (e.g., the battery of the NFC-enabled device). In other embodiments, the target device may play a passive role, similar to a smart card, in which circuitry generating the target signal is powered by the initiator signal 1010. In either case, the far-field signal 1030 illustrates how both the initiator signal 1010 and the target signal 1020 would appear to, for example, an eavesdropping antenna in the far field (e.g., approximately 10 feet away). As illustrated, an eavesdropping antenna would have little difficulty determining when the data exchange occurs and as well as the data itself.

Figure 11:
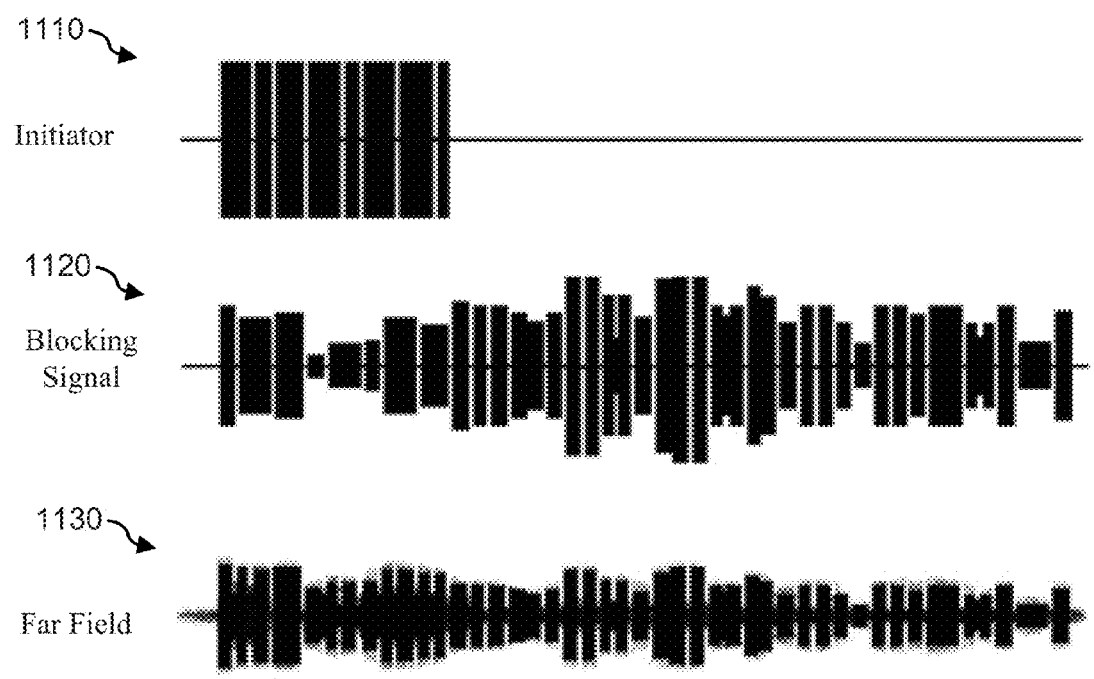
FIG. 11 illustrates example signaling during the data exchange between NFC-enabled devices, utilizing an embodiment of signal-techniques described herein.

FIG. 11 illustrates how signal-blocking techniques can be utilized to mask the initiator signal. Here, similar to FIG. 10, an initiator signal 1110 is sent by a device initiating the data exchange. Additionally, however, the initiating device transmits a blocking signal 1120 using, for example an electric-field antenna such as the folded dipole antenna 910 of FIG. 9A. The resulting far-field signal 1130 is a signal in which the initiator signal is effectively masked.

Characteristics of the blocking signal 1120 can vary, depending on desired functionality. The type and rate of the modulation of the blocking signal 1120 can be the same or similar to the type and rate of the modulation of the initiator signal 1110, thereby effectively masking the initiator signal 1110 by not allowing a would-be eavesdropper to separate blocking signal 1120 and initiator signal 1110 with filtering. Furthermore, amplitude and/or modulation of the blocking signal can be randomized. Randomizing the amplitude of the blocking signal 1120 not only can effectively mask the data transmitted in the initiator signal 1110, but also mask when the initiator signal 1110 is transmitted. In this case, the blocking signal 1120 can be configured to last much longer than the initiator signal 1110, as shown. Thus some embodiments generate a blocking signal 1120 can begin when initiator signal 1110 starts, or earlier, and end when initiator signal 1110 ends, or after. Other embodiments may only transmit the blocking signal 1120 while the initiator signal 1110 is transmitted. In some embodiments, the blocking signal 1120 is transmitted such that the peak of the blocking signal 1120 is at least twice the amplitude of the initiator signal 1110. A similar blocking signal can be generated to mask a target signal (e.g., the target signal 1020 of FIG. 10).

The timing of blocking signal can vary depending on the devices used. In one configuration, the initiating device can transmit blocking signals for signals generated by both the initiating and target devices. This configuration can be utilized when the target device assumes a passive role and/or is incapable of generating a blocking signal. In other configurations, each device may generate blocking signals to mask their respective initiator and/or target signals. In yet other configurations, the target device may be the only generating blocking signals. In some data exchanges, one or both devices may generate one or more blocking signals during the entire data exchange. In other data exchanges, one or more blocking signal(s) may be selectively transmitted to mask only the parts of the data exchange; for example, only masking signals in which sensitive data is transmitted. As indicated in embodiments described above, blocking signals can be modulated to simulate data exchanges following a certain protocol (e.g., a CSC protocol).

Figure 12:
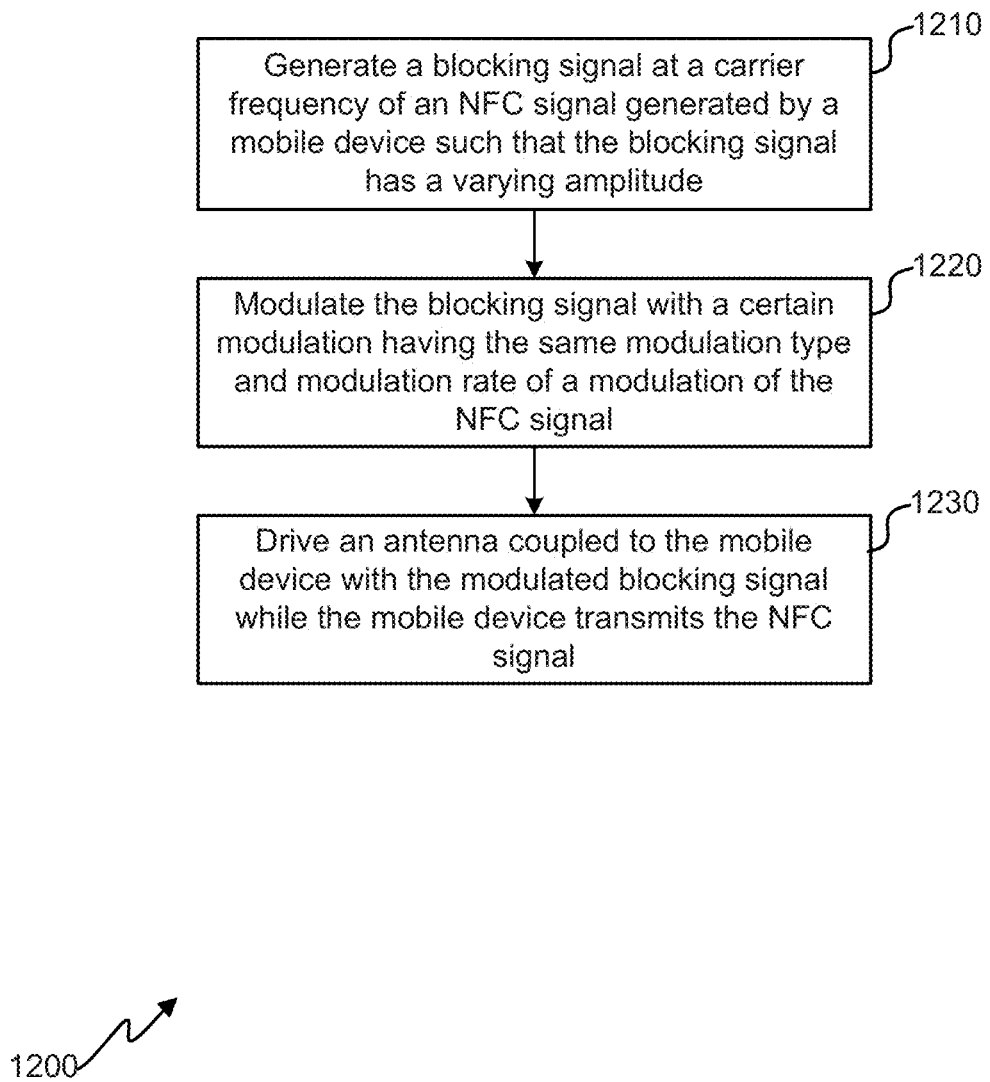
FIG. 12 illustrates a method for protecting signals exchanged between NFC-enabled devices, according to one embodiment.

FIG. 12 is a flow diagram illustrating a method 1200 of protecting NFC signals, according to one embodiment. At block 1210, a blocking signal is generated at a carrier frequency of an NFC signal generated by a mobile device such that the blocking signal has varying amplitude. As discussed previously, the varying amplitude can not only mask the data transmitted by the NFC signal, but can also mask when the NFC signal is transmitted. Depending on desired functionality, the blocking signal can be generated to mask one NFC signal, or a plurality of NFC signals, generated by either of both NFC-devices engaged in a data exchange.

At block 1220 the blocking signal is modulated with a certain modulation having the same modulation type (e.g., amplitude, phase, etc.) and modulation rate of a modulation of the NFC signal. The modulation can be random (e.g., randomly modulating the carrier frequency at a rate that matches the modulation rate of the NFC signal).

At block 1230 an antenna coupled to the mobile device is driven with the modulated blocking signal while the mobile device transmits the NFC signal. Some embodiments may include a second antenna (which can be perpendicular to the first antenna). In such embodiments the first and second antennas may be driven alternately by the blocking signal.

As indicated above, the blocking signal can be transmitted based on detecting the NFC signal (and/or generate a second blocking signal when detecting an NFC signal from a separate device), such as in embodiments in which a transmit circuit driving the antenna is not integrated into the mobile device (e.g., included in an accessory to the mobile device). Alternatively, some embodiments may include a single transmitter (or synchronized transmitter) circuits configured to transmit both the NFC and blocking signals.

It should be appreciated that the specific blocks illustrated in FIG. 12 provide an example method 1200 of protecting NFC signals, according to one embodiment. Alternative embodiments may include alterations to the embodiments shown. Furthermore, additional features may be added or removed depending on the particular applications. One of ordinary skill in the art would recognize many variations, modifications, and alternatives.

Although embodiments described in regards to FIGS. 9-12 discuss generating blocking signals for peer-to-peer data exchanges between two NFC-enabled devices, embodiments are not so limited. The techniques described can be applied in other circumstances, such that an NFC-enabled device generates one or more blocking signals when exchanging data with other devices, such as a smart card (e.g., the smartcard 120 of FIG. 1), card reader (e.g., the card reader 110 of FIG. 1), radio frequency identification (RFID) tags (active and/or passive), and the like. Moreover, techniques for transmitting blocking signals described herein can be configured to mask communications utilizing RF signals other than NFC.

As will be understood by those skilled in the art, the present invention may be embodied in other specific forms. Those skilled in the art will recognize, or be able to ascertain using no more than routine experimentation, many equivalents to the specific embodiments of the invention described herein. Such equivalents are intended to be encompassed by the following claims.

What is claimed is:

1. A transmitter for protecting a first near-field communication (NFC) signal transmitted by a mobile device, the transmitter comprising:
   a first transmit circuit configured to generate the first NFC signal;
   a second transmit circuit configured to:
      generate a first blocking signal having a carrier frequency of the first NFC signal; and
      modulate the first blocking signal with a type of amplitude modulation of the first NFC signal; and
   an NFC antenna:
      communicatively coupled with the first transmit circuit so as to transmit the first NFC signal, and
      configured to be coupled with the mobile device; and
   a second antenna:
      communicatively coupled to the second transmit circuit so as to transmit the first blocking signal while the first NFC signal is transmitted, and
      configured to be coupled with the mobile device.

2. The transmitter of claim 1, wherein the second transmit circuit is configured to generate a second blocking signal such that the second blocking signal is transmitted while a second NFC signal is transmitted by a device other than the mobile device.

3. The transmitter of claim 1, wherein the second transmit circuit is configured to generate the first blocking signal such that the first blocking signal is transmitted while a second NFC signal is transmitted by a device other than the mobile device.

4. The transmitter of claim 1, wherein the second transmit circuit is configured to generate the first blocking signal such that the first blocking signal has a varying amplitude.

5. The transmitter of claim 1, wherein the second transmit circuit and the second antenna are embedded within an accessory configured to be physically coupled with the mobile device.

6. The transmitter of claim 1, wherein the second transmit circuit and the second antenna are embedded within the mobile device.

7. The transmitter of claim 1, wherein the second antenna is a dipole antenna.

8. The transmitter of claim 1, wherein the NFC antenna is configured to transmit the first NFC signal by modulating a magnetic field.

9. The transmitter of claim 1, further comprising a detection circuit configured to detect the first NFC signal, wherein the detection circuit is coupled to the second transmit circuit such that the second transmit circuit generates the first blocking signal when the detection circuit detects the first NFC signal.

10. The transmitter of claim 9, wherein the detection circuit is configured to detect a second NFC signal from a device other than the mobile device, and wherein the detection circuit is coupled to the second transmit circuit such that the second transmit circuit generates a second blocking signal when the detection circuit detects the second NFC signal.

11. The transmitter of claim 1, further comprising a third antenna coupled to the second transmit circuit, wherein the second transmit circuit is configured to drive the third antenna and the second antenna with the first blocking signal in an alternating fashion.

12. The transmitter of claim 11, wherein the second antenna is disposed perpendicular to the third antenna.

13. The transmitter of claim 1, further comprising a pseudo-random number generator coupled to the second transmit circuit.

14. The transmitter of claim 13, wherein the second transmit circuit is configured to modulate the first blocking signal using values from the pseudo-random number generator.

15. The transmitter of claim 13, wherein the second transmit circuit is configured to vary an amplitude of the first blocking signal using values from the pseudo-random number generator.

16. A method of protecting near-field communication (NFC) signals, the method comprising:
   generating a first NFC signal;
   generating a first blocking signal at a carrier frequency of the first NFC signal generated by a mobile device such that the first blocking signal has a varying amplitude;
   modulating the first blocking signal with a certain modulation having the same amplitude modulation type and modulation rate of the first NFC signal;
   driving an NFC antenna coupled to the mobile device to transmit the first NFC signal; and
   driving a second antenna coupled to the mobile device to transmit the modulated first blocking signal while the mobile device transmits the first NFC signal.

17. The method of claim 16, further comprising:
   detecting a second NFC signal generated by a device other than the mobile device; and
   driving the second antenna with a second modulated blocking signal in response to detecting the second NFC signal.

18. The method of claim 16, further comprising driving the second antenna the modulated first blocking signal while a second device transmits a second NFC signal.

19. A mobile device comprising:
   an NFC antenna;
   a signal-blocking antenna; and
   a processing unit coupled to the NFC antenna and the signal-blocking antenna, the processing unit configured to perform functions including:
      causing the NFC antenna to transmit an NFC signal having a carrier frequency, a modulation rate, and a modulation type;

generating a blocking signal at the carrier frequency of the NFC signal;

modulating the blocking signal with a certain modulation having the same carrier frequency, modulation rate, and modulation type as the NFC signal; and causing the signal-blocking antenna to transmit the modulated blocking signal while the NFC antenna is transmitting the NFC signal.

20. The mobile device of claim 19, wherein the processing unit is configured to cause the signal-blocking antenna to transmit the modulated blocking signal while the NFC antenna receives one or more NFC signals from another device.

* * * * *